US012790899B2

(12) United States Patent
Batarseh et al.

(10) Patent No.: US 12,790,899 B2
(45) Date of Patent: Nov. 10, 2026

(54) SYSTEM AND METHODS FOR IN-SITU PERMEABILITY MEASUREMENTS

(71) Applicant: SAUDI ARABIAN OIL COMPANY, Dhahran (SA)

(72) Inventors: Sameeh Issa Batarseh, Dhahran (SA); Safiyah Fayez Alghamdi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 19 days.

(21) Appl. No.: 18/739,681

(22) Filed: Jun. 11, 2024

(65) Prior Publication Data

US 2025/0376895 A1 Dec. 11, 2025

(51) Int. Cl.
*E21B 7/15* (2006.01)
*B23K 26/064* (2014.01)
(Continued)

(52) U.S. Cl.
CPC .............. *E21B 7/15* (2013.01); *B23K 26/064* (2015.10); *E21B 29/06* (2013.01); *E21B 43/11* (2013.01); *E21B 47/07* (2020.05); *E21B 47/135* (2020.05)

(58) Field of Classification Search
CPC ... E21B 7/14; E21B 7/15; E21B 29/06; E21B 29/02; E21B 43/11; E21B 47/07; E21B 47/135; B23K 26/064–0652
See application file for complete search history.

(56) References Cited

U.S. PATENT DOCUMENTS 4,227,582 A * 10/1980 Price .................... E21B 43/114 219/121.84
4,353,249 A * 10/1982 Lagus .................... E21B 47/11 73/152.52

(Continued)

FOREIGN PATENT DOCUMENTS

CN 102455277 A 5/2012
CN 203081295 U 7/2013
WO WO-2013019959 A2 * 2/2013 ............ B23K 26/38

OTHER PUBLICATIONS

Batarseh, S.I. et al., "SPE-188507-MS: High Power Laser Technology in Downhole Applications, Reshaping the Industry," Society of Petroleum Engineers, pp. 1-15, Nov. 13-16, 2017 (15 pages).

(Continued)

*Primary Examiner* — George S Gray
(74) *Attorney, Agent, or Firm* — Osha Bergman Watanabe & Burton LLP

(57) ABSTRACT

A method for performing in-situ permeability measurements in a wellbore includes multiple steps. The method includes providing a laser tunnelling system for in-situ permeability measurements that includes a laser generation unit configured to generate a laser beam, a downhole tool including a laser head, and a fiber optic cable coupled to the laser generation unit and configured to convey the laser beam to the downhole tool. The method further includes emitting the laser beam, from the laser head, against the wellbore to form a sealed tunnel through a rock formation surrounding the downhole tool to reach an undamaged zone. The method further includes retrieving a sensor signal from at least one sensor and determining permeability of the undamaged zone from the sensor signal.

17 Claims, 8 Drawing Sheets

(51) Int. Cl.

| | |
|---|---|
| ***E21B 29/06*** | (2006.01) |
| ***E21B 43/11*** | (2006.01) |
| ***E21B 47/07*** | (2012.01) |
| ***E21B 47/135*** | (2012.01) |

(56) References Cited

U.S. PATENT DOCUMENTS

| | | | | |
|---|---|---|---|---|
| 6,755,262 | B2 | 6/2004 | Parker | |
| 6,888,097 | B2 | 5/2005 | Batarseh | |
| 7,938,175 | B2 | 5/2011 | Skinner et al. | |
| 9,217,291 | B2 | 12/2015 | Batarseh | |
| 9,507,047 | B1 | 11/2016 | Dvorkin et al. | |
| 2006/0102343 | A1* | 5/2006 | Skinner | B23K 26/082 166/57 |
| 2006/0118303 | A1* | 6/2006 | Schultz | E21B 43/088 166/55 |
| 2010/0044103 | A1* | 2/2010 | Moxley | E21B 7/15 166/65.1 |
| 2010/0326659 | A1* | 12/2010 | Schultz | E21B 29/06 166/297 |
| 2012/0152542 | A1* | 6/2012 | Le | E21B 47/01 166/297 |
| 2013/0228372 | A1* | 9/2013 | Linyaev | E21B 43/26 175/16 |
| 2014/0360778 | A1* | 12/2014 | Batarseh | E21B 7/15 175/17 |
| 2017/0167233 | A1* | 6/2017 | Sampson | E21B 43/117 |
| 2021/0285294 | A1* | 9/2021 | Batarseh | B23K 26/142 |

OTHER PUBLICATIONS

International Search Report issued in corresponding International Application No. PCT/US2025/033199; mailed Aug. 22, 2025 (5 pages).

Written Opinion of the International Searching Authority issued in corresponding International Application No. PCT/US2025/033199; dated Aug. 22, 2025 (9 pages).

Mahesar, Aftab Ahmed, et al., “Experimental Study on Gas Slippage of Tight Gas Sands in Kirthar Fold Belt Sindh, Pakistan,” Mehran University Research Journal of Engineering & Technology, vol. 36, No. 3, 2017 (14 pages).

Rushing, J.A., et al., “Klinkenburg-Corrected Permeability Measurements in Tight Gas Sands: Steady-State Versus Unsteady-State Techniques,” Society of Petroleum Engineers, 2004 (11 pages).

* cited by examiner

SYSTEM AND METHODS FOR IN-SITU PERMEABILITY MEASUREMENTS

BACKGROUND

Permeability is a physical property that affects the flow of fluids in porous media, such as oil and gas reservoirs. Typically, in the oil and gas field, measurement of the permeability is done by bringing samples from the subsurface to the surface and performing a measurement. However, because the rocks in the subsurface are under geological stress, this method does not accurately reflect in-situ measurements. In addition, drilling operations create near-wellbore damage when making the borehole. This damage is estimated to be three to four times larger in size than the wellbore. Consequently, measurements of permeability around the wellbore acquired by other means, such as with logging tools (e.g., a nuclear magnetic resonance tool), are often inaccurate and do not represent the true permeability of the surrounding rock formation. Accordingly, there exists a need to perform in-situ permeability measurements of the surrounding rock formation beyond the damage zone.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a laser tunnelling system for in-situ permeability measurements in a wellbore. The system includes a laser generation unit configured to generate a laser beam, a downhole tool, and a fiber optic cable coupled to the laser generation unit and configured to convey the laser beam to the downhole tool. The downhole tool includes a laser head that receives the laser beam. The laser head includes a laser muzzle positioned to emit the laser beam from the laser head, a purging nozzle proximate to the laser muzzle and configured to discharge a pressurized gas, at least one of a pressure sensor and a gas flow rate meter adjacent to the laser muzzle and configured to monitor the pressurized gas, and a seal pad adjacent to the laser muzzle. The downhole tool further includes a 3-axis gimbal from which the laser head is mounted.

Embodiments disclosed herein generally relate to a method for in-situ permeability measurements in a wellbore. The method includes providing a laser tunnelling system for in-situ permeability measurements that includes a laser generation unit configured to generate a laser beam, a downhole tool including a laser head, and a fiber optic cable coupled to the laser generation unit and configured to convey the laser beam to the downhole tool. The method further includes emitting the laser beam, from the laser head, against the wellbore to form a sealed tunnel through a rock formation surrounding the downhole tool to reach an undamaged zone. The method further includes retrieving a sensor signal from at least one sensor and determining permeability of the undamaged zone from the sensor signal.

Embodiments disclosed herein generally relate to a system for performing in-situ permeability measurements in a wellbore. The system includes a laser tunnelling system that includes a laser generation unit configured to generate a laser beam, a downhole tool, and a fiber optic cable coupled to the laser generation unit and configured to convey the laser beam to the downhole tool. The downhole tool includes a laser head that receives the laser beam. The laser head includes a laser muzzle positioned to emit the laser beam from the laser head, a purging nozzle proximate to the laser muzzle and configured to discharge a pressurized gas, at least one of a pressure sensor and a gas flow rate meter adjacent to the laser muzzle and configured to monitor the pressurized gas, and a seal pad adjacent to the laser muzzle. The downhole tool further includes a 3-axis gimbal from which the laser head is mounted. The system further includes a deployment device configured to convey the downhole tool into the wellbore.

Other aspects and advantages of the claimed subject matter will be apparent from the following description and the appended claims.

DETAILED DESCRIPTION

Figure 1:
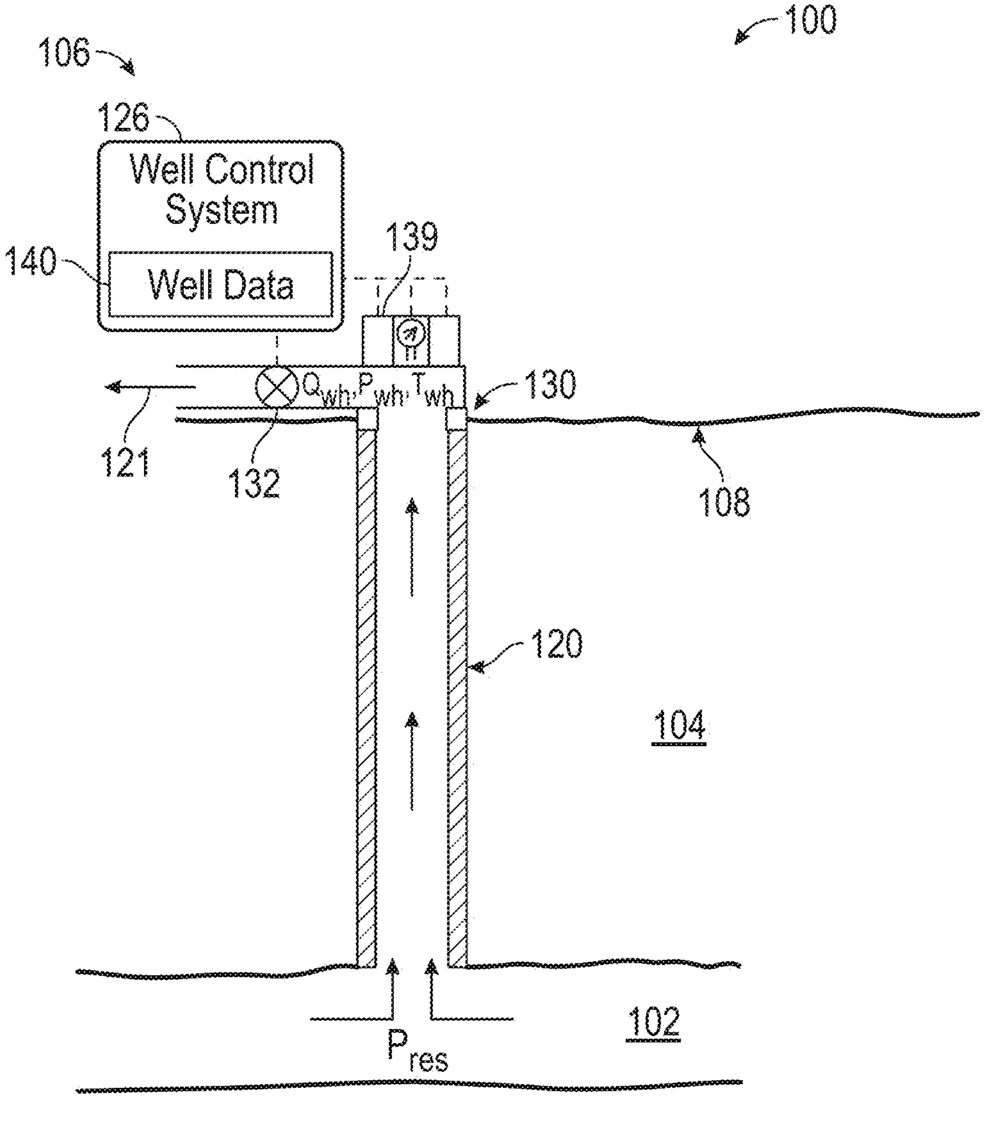
FIG. 1 depicts a well system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. For example, a "purging nozzle" may include any number of "purging nozzles" without limitation.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-9, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Permeability is an intrinsic material property, often used with respect to a connected porous media, that describes the ability of fluids (liquids, gases, multiphase, etc.) to pass through the material. Traditionally, permeability may be characterized through the measurement of the steady flow rate associated with a given pressure gradient (Darcy's law) or through unsteady-state methods, such as pressure decay and pore pressure transmission methods. In the oil and gas field, measurements of the permeability of subsurface formations are typically performed by retrieving a representative rock sample of the formation to the surface and analyzing it. This method does not reflect an in-situ (i.e., from within the wellbore) measurement, because the rocks in the subsurface are under geological stress. Similarly, in-situ measurements at the wellbore (e.g., using nuclear magnetic resonance) also are not representative since the drilling operations cause damage to subsurface formations in the vicinity of the borehole, thus rendering any permeability measurements inaccurate. The damaged subsurface region in the vicinity of the wellbore is referred to herein as the damage zone. The damage zone is typically annular and generally extends radially from the wellbore penetrating a distance of three to four times the radius of the wellbore into the surrounding subsurface.

Embodiments disclosed herein generally relate to methods and systems for measuring the in-situ permeability of a surrounding rock formation in a wellbore beyond the damage zone. As will be described, these methods and systems use laser technology to create a sealed tunnel through the damage zone to access undamaged subsurface formations using a high power laser beam originating in the wellbore. The high power laser beam is directed using an actuatable laser head. Then, the end of the sealed tunnel is perforated using the high power laser beam. Perforation of the end of the sealed tunnel is described in greater detail later in the instant disclosure. However, for now it is sufficient to state that perforation involves removing a melt layer from the end of the sealed tunnel such that a fluid, conveyed by the sealed tunnel that extends from the wellbore through the damage zone, can pass into the undamaged subsurface formations. Further, in accordance with one or more embodiments, a 3-axis gimbal seals the laser head against the wellbore wall and a purging nozzle injects a pressurized gas (e.g., air, nitrogen, etc.) into the sealed tunnel. In one or more embodiments, the in-situ permeability of the surrounding rock formation is determined using a steady-state method. In the steady-state method, the pressurized gas is injected into the sealed tunnel at constant pressure and the permeability is determined from the measured gas pressure and gas flow rate. In another embodiment, the in-situ permeability of the surrounding rock formation is determined using an unsteady-state method. In the unsteady-state method, the steady-state is perturbed by imposing a pressure gradient across the sealed tunnel and the permeability is determined from the measured differential pressure decay.

As will be demonstrated, advantages of the methods and systems disclosed herein include the ability to perform in-situ permeability measurements beyond the near-wellbore damage zone by allowing a pressurized gas to be injected directly into the undamaged matrix formation. Embodiments disclosed herein teach the use of a high power laser to create a sealed tunnel, perforate the end of the tunnel to allow pressurized gas access to the undamaged matrix formation, and measure the in-situ permeability of the surrounding rock formation using steady-state and unsteady-state methods. As such, the methods and systems of the present disclosure provide accurate and reliable in-situ permeability measurements beyond the damage zone.

While a full description of the steps required to drill a subterranean well (i.e., a wellbore) into a formation exceeds the scope of this disclosure, it may simply be said that a drill string, including a drill bit and drill collars to weight the drill bit, may be inserted into a pre-drilled hole and rotated to cut into the rock at the bottom of the hole, producing rock cuttings. Commonly, a drilling fluid, or drilling mud, may be utilized during the drilling process. To remove the rock cuttings from the bottom of the wellbore, drilling fluid is pumped down through the drill string to the drill bit. The drilling fluid may cool and lubricate the drill bit and provide hydrostatic pressure in the wellbore to provide support to the sidewalls of the wellbore. The drilling fluid may also prevent the sidewalls from collapsing and caving in on the drill string and prevent fluids in the downhole formations from flowing into the wellbore during drilling operations. Additionally, the drilling fluid may lift the rock cuttings away from the drill bit and upwards as the drilling fluid is recirculated back to the surface. The drilling fluid may transport rock cuttings from the drill bit to the surface, which may be referred to as "cleaning" the wellbore, or hole cleaning.

FIG. 1 shows a schematic diagram of a well environment (100) in accordance with one or more embodiments. As shown in FIG. 1, a well environment (100) includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath a geological surface ("surface") (108). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a logging system (not shown), a wellbore (120), and a well control system ("control system") (126). The logging system may include one or more logging tools for generating well logs of the formation (104). The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) lowered into the hydrocarbon-bearing formation (104) or the reservoir (102) during monitoring operations (e.g., during in-situ logging operations).

In some embodiments, during operation of the well system (106), the well control system (126) controls various operations of the well system (106) (e.g., production operations) and collects and records well data (140). The well control system (126) may include sensors for sensing characteristics of substances such as, for example, production (121). The sensor readings may include data about one or more of pressure, temperature, flow rate, and vibration. The sensor readings may be obtained using specialized tools such as thermometers, pressure gauges, and flowmeters (e.g., venturi meters, turbine meters, ultrasonic meters, electromagnetic meters, etc.). In some embodiments, the well control system (126) includes a computer system that is the same as or similar to that of a computer system (902) described below in FIG. 2 and the accompanying description.

In some embodiments, the well data (140) are recorded in real time, or near real time, and are available for review or use within seconds, minutes or hours of the condition being sensed (e.g., the measurements are available within 1 hour of the condition being sensed). In such an embodiment, the well data (140) may be referred to as "real time" well data (140). Real time well data (140) may enable an operator of the well to assess a relatively current state of the well system (106) and make real time decisions regarding a development of the well system (106) and the reservoir (102), such as regulation of production flow from the well.

In some embodiments, the well system (106) includes a wellhead (130). The wellhead (130) may include a rigid structure installed at the "up-hole" end of the wellbore (120), at or near where the wellbore (120) terminates at the geological surface (108). The wellhead (130) may include structures for supporting (or "hanging") casing and production tubing extending into the wellbore (120). Production (121) may flow through the wellhead (130) after exiting the wellbore (120). In some embodiments, the wellhead (130) includes flow regulating devices that are operable to control the flow of substances into and out of the wellbore (120). For example, the wellhead (130) may include one or more production valves (132) that are operable to control the flow of production (121). For example, a production valve (132) may be fully opened to enable the unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120).

Keeping with FIG. 1, in some embodiments, the wellhead (130) may include sensors for sensing characteristics of substances, including production (121), passing through. The sensor readings may include, at least, data about pressure, temperature, flow rate, and vibration. The sensor readings may be obtained using specialized tools such as, at least, thermometers, pressure gauges, and flowmeters (e.g., venturi meters, turbine meters, ultrasonic meters, electromagnetic meters, etc.). The characteristics may include, for example, pressure ($P_{wh}$), temperature ($T_{wh}$) and flow rate ($Q_{wh}$) of production (121) flowing through the wellhead (130), or other conduits (e.g., production tubing), after exiting the wellbore (120). In one or more embodiments, the flow rate $Q_{wh}$ is measured by a flow rate sensor (139).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high-pressure valves and at least two chokes. These chokes may be fixed or adjustable or a mix of both. Redundancy may be provided so that if one choke must be taken out of service, the flow may be directed through another choke. Effective control of the choke assembly prevents damage to equipment and promotes longer periods of production without shutdowns or interruptions. In some embodiments, pressure valves and chokes are communicatively coupled to the well control system (126). Accordingly, a well control system (126) may obtain wellhead data regarding the choke assembly as well as transmit one or more commands to components within the choke assembly to adjust one or more choke assembly parameters.

Operation of a well can be directed, at least in part, based on a measure of the permeability of the subsurface formations (104) penetrated by the well. For instance, permeability measurements (along with other petrophysical properties) are part of formation evaluation tools that help assess the potential productivity and therefore commercial value of a reservoir (102). As discussed above, conventional permeability measurements are often acquired through laboratory testing (e.g., a permeameter test) of samples extracted from the subsurface formations (104), well logging techniques (e.g., nuclear magnetic resonance), subsurface imaging techniques (e.g., seismic surveys), and computational techniques (e.g., inverse modeling), among others. A major disadvantage of these methods is that they often report approximate and/or inaccurate estimates of the true permeability of a formation (104). For example, samples removed from the subsurface for laboratory testing are no longer subject to geological stress, which alters their natural permeability, and thus renders inaccurate permeability results. As another example, downhole tools may be lowered directly into the wellbore (120) to determine the permeability of the formation (104) in-situ. However, these tools typically probe the vicinity of the wellbore (120) which, as previously stated, is affected by the damage caused by drilling operations. For example, injection of drilling fluids into the formation (104) and compaction (i.e., consolidation of sediments) during drilling operations may block pore spaces which effectively reduces the permeability of the rock formation (104) near the wellbore (120). Taken together, these methods have their own set of potential errors and limitations that lead to erroneous estimates of the true permeability of the formation (104). Accordingly, embodiments disclosed herein relate to a laser tunnelling system for in-situ permeability measurements ("laser tunneling system") beyond the damage zone. Depictions of various configurations of the laser tunneling system and methods of its use are provided in FIGS. 2, 5, and 6 along with accompanying descriptions.

Figure 2:
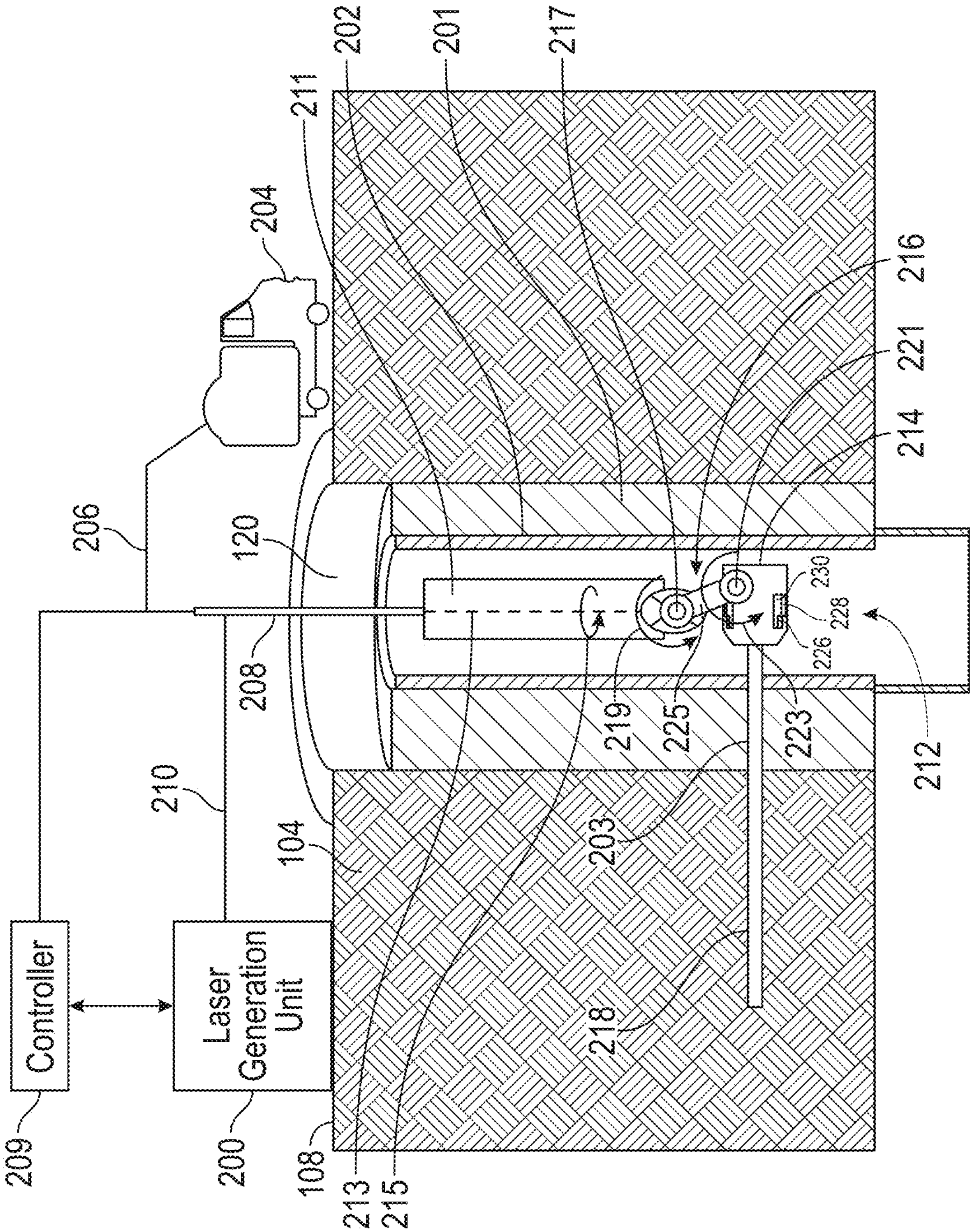
FIG. 2 depicts a system in accordance with one or more embodiments.

In accordance with one or more embodiments, FIG. 2 depicts a laser tunnelling system for in-situ permeability measurements. In the depiction of FIG. 2, the wellbore (120) has been dug into the formation (104) using a drilling system (e.g., a drill string and drill bit). Further, the wellbore (120) is reinforced with cement (201) and casing (202). The laser tunneling system includes a laser generation unit (200). In one or more embodiments, and as depicted in FIG. 2, the laser generation unit (200) is located at the surface (108). The laser generation unit (200) includes a high power laser source that provides the power required to generate a high power laser beam (203). A high power laser beam (203) refers to a laser beam that carries a significant amount of optical power. In some embodiments, the power of the high power laser beam (203) is in the 2-100 kW range. The laser generation unit (200) may be of any type capable of generating the high power laser beam (203) such as, for example, a gas laser, a solid-state laser, a fiber laser, a liquid laser (e.g., a dye laser) and a semiconductor laser (e.g., a laser diode). In some embodiments, the high power laser beam (203) may be an Ytterbium (Yb) fiber laser. One skilled in the art will appreciate that other suitable laser types exist and may be used without limiting the scope of the present disclosure.

In accordance with one or more embodiments, a mobile deployment unit (204) (e.g., a coiled tubing unit) located at the surface (108) and close to the existing wellbore (120) supports the deployment of a deployment device (206) used to lower a downhole tool (212) of the laser tunnelling system into the wellbore (120). In some embodiments, coiled tubing is used as a deployment device (206). Coiled tubing is a continuous and long metal pipe that is spooled on a large reel. The coiled tubing is typically made of steel or other alloys, and it comes in multiple diameters (typically 1 to 3.25 in) and lengths (ranging from 2,000 to more than 30,000 ft). Further, the tubing is coiled in a single and continuous length, instead of as a jointed pipe. Coiled tubing is highly flexible, allowing it to be easily inserted and retrieved from the wellbore (120), and may be pushed into the wellbore (120) using, for example, a hydraulic injector head. In another embodiment of the present invention, the deployment device (206) is a wireline. Wireline refers to a single steel cable (or wire) that is spooled onto a drum. It is a thin, highly durable cable designed for lowering and retrieving tools (e.g., the downhole tool (212)) and instruments into and out of the wellbore (120). A wireline is typically used for lowering tools (e.g., the downhole tool (212)) into the wellbore (120) for data acquisition (e.g., well logging), perforation, and sampling.

In accordance with one or more embodiments, the laser tunnelling system for in-situ permeability measurements ("laser tunnelling system") further includes a power cable (208) that may communicate electrical power and signals between the surface (108) (e.g., mobile deployment unit (204)) and the downhole tool (212). The laser tunneling system further includes a controller (209) communicably connected to the laser generation unit (200) and the downhole tool (212). The controller (209) controls the motion and operation of the downhole tool (212), as described in greater detail below. In some embodiments, the controller (209) includes a computer system that controls the downhole tool (212), where the computer system is the same as or similar to that of a computer system (902) described below in FIG. 9 and the accompanying description. Thus, the computer system (902) may be programmed to automatically move the downhole tool (212) to a target depth, direction, and orientation. In one or more embodiments, the controller (209) may be part of the laser generation unit (200). In other embodiments, the controller (209) may be separate from the laser generation unit (200). For example, the controller (209) may be located in the deployment device (206). In addition, the laser tunneling system includes an insulation cable (210) that is used to communicate optical signals (e.g., the high power laser beam (203)) from the laser generation unit (200) to the downhole tool (212). In one or more embodiments, the insulation cable (210) may include one or more optical fibers. The insulation cable (210) may be selected to withstand the elevated pressures and temperatures experienced in the wellbore (120). One skilled in the art will appreciate that other suitable materials exist and may be used without limiting the scope of the present disclosure.

Keeping with FIG. 2, the downhole tool (212) of the laser tunneling system includes a longitudinal body (211), a laser head (214), and a 3-axis gimbal (216). In one or more embodiments, the longitudinal body (211) houses one or more sensors and a communication module for receiving and transmitting data (e.g., sensor measurements, laser control signals, etc.) between the surface (e.g., controller (209)) and the downhole tool (212). The 3-axis gimbal (216) is disposed on the distal end of the longitudinal body (211) and is actuatable according to commands received from the surface (e.g., controller (209)). The laser head (214) is mounted on the 3-axis gimbal (216) and thus can be positioned and oriented by the 3-axis gimbal (216). As previously stated, the downhole tool (212) and the 3-axis gimbal (216) are controlled by the controller (209). In one or more embodiments, the downhole tool (212) is in communication with the controller (209) such that it may be lowered to a target depth (e.g., a true vertical depth) within the wellbore (120) using the deployment device (206). For example, the downhole tool (212) may be equipped with one or more sensors (e.g., a depth sensor, such as an acoustic sensor) that transmit an electrical signal to the controller (209) when a target depth is reached. The one or more sensors can be housed in the longitudinal body (211). In other embodiments, the depth of the downhole tool (212) is determined using the deployment device (206), for example, by noting the length of the coiled tubing that has entered the wellbore (120). In general, the construction materials of the downhole tool (212) may be selected out of any type of material that are resistant to the high temperatures and pressures. Further, these materials may protect the downhole tool (212) from fluids, dust, vapor, and other environmental conditions experienced in the wellbore (120). One skilled in the art will appreciate that other suitable materials exist and may be used without limiting the scope of the present disclosure.

In accordance with one or more embodiments, the 3-axis gimbal (216) includes a rotation joint (or rotation head), a pivot joint, and a tilt joint. FIG. 2 depicts a roll axis (213) that is coaxial with the longitudinal body (211) of the downhole tool (212). In one or more embodiments, the 3-axis gimbal (216) includes a rotation joint (not depicted) such that the 3-axis gimbal, or the portion of the 3-axis gimbal distal to the rotation joint, can rotate over a first degree of freedom (DOF) (215) defined by the roll axis (213). The first DOF (215) may also be referred to as a "roll DOF." In one or more embodiments, the 3-axis gimbal (216) further includes a pivot joint (217) about which a pivot arm (225) of the 3-axis gimbal (216) can rotate over a second DOF (219). The second DOF (219) may also be referred to as a "pivot DOF." In one or more embodiments, the 3-axis gimbal (216) further includes a tilt joint (221) about which the laser head (214) can rotate over a third DOF (223). The third DOF (223) may also be referred to as a "tilt DOF." In accordance with one or more embodiments, and as depicted in FIG. 2, the pivot DOF (219) and the tilt DOF (223) operate in parallel planes. Further, the roll DOF (215) operates in a plane that is orthogonal to the planes of operation of the pivot and tilt DOFs (219, 223). In one or more embodiments, the rotation joint may rotate 360 degrees. In general, the rotation joint, pivot joint, and tilt joint may be based on a hydraulic system, an electrical system, a motor system, or any combination thereof to provide actuation over the described degrees of freedom. Thus, the 3-axis gimbal (216) allows full range of motion of the laser head (214) in any direction of space. In another embodiment, once the laser head (214) is at the target depth and the 3-axis gimbal (216) is aligned with a target direction and orientation, the downhole tool (212) may communicate to the controller (209) that operation of the high power laser beam (203) may start.

In some embodiments, the laser generation unit (200) may control the settings of the high power laser beam (203), such as energy, power, wavelength, timing (e.g., continuous operation, pulsed operation, etc.), direction, and beam size. In one or more embodiments, the energy, power, wavelength, timing, direction, and beam size of the high power laser beam (203) may be selected depending on the type of materials that need to be removed from the formation (104) to create a sealed tunnel (218). The subsurface formation (104) can include or span various rock types (or formation types) such as limestone, shale, and sandstone. The specific rock type associated with a given depth of the wellbore (120) can be determined, among other methods, by inspection of samples taken from the formation (104), analysis of logs acquired using one or more logging tools, and through analysis of seismic data acquired with a seismic survey. Examples of logs used to determine the rock type at a given depth of the wellbore (120) include, but are not limited to, gamma ray logs, density logs, neutron logs, sonic logs, and resistivity logs.

In FIG. 2, the downhole tool (212) is depicted within the wellbore (120) surrounded by casing (202), cement (201), and the subsurface formation (104). In some embodiments, as previously stated, the downhole tool (212) may remove material from the formation (104) to create a sealed tunnel (218). In general, the sealed tunnel (218) has an open end (located close to the wellbore (120) wall and the downhole tool (212)) and a closed end (located inside the formation (104)). In general, the downhole tool (212) is not limited to tunneling through the cement (201) and the casing (202). For example, the methods and systems disclosed herein may be applicable to an "open hole" wellbore (120), i.e., a wellbore (120) in which at least a portion of the wellbore (120) has no casing (202). Further, the downhole tool (212) may penetrate through equipment (e.g., wireline tools) installed in the wellbore (120).

In general, different rock types may undergo various processes and transformations depending on the temperatures they are exposed to. For example, rocks may collapse, spall, dissociate, melt, and vaporize as the temperature increases. Spalling refers to the breaking off of small fragments from the surface of the rock. Dissociation refers to the separation of minerals within the rock. Vaporization refers to the transformation of the rock from solid to vapor. While rocks do not typically vaporize under normal conditions, extreme temperatures may lead to the vaporization of the rock components. For example, one of the several features of the high power laser beam (203) is that it may produce high temperatures when interacting with materials, such as rocks, thus raising their temperature in seconds. In one or more embodiments, when the high power laser beam (203) interacts with sandstone the temperature may rapidly rise from room temperature to 2000° C. within seconds. This unique feature of the high power laser beam (203) may be utilized to create the sealed tunnel (218).

In one embodiment of the present invention, different rock types were tested to evaluate the effects of temperature on the rock types and to identify the melting temperature required to form a sealed tunnel (218). For example, in a given test, sandstone melted at 1400° C. and limestone dissociated at 1100° C. At lower temperatures (e.g., around 400° C.) the rock may spall (i.e., break into small fragments) and at even lower temperatures (300° C. to 570° C.) clays may collapse. As another example, a test was done on sand grains to evaluate an extreme case where the wellbore (120) is unconsolidated. In geological terms, unconsolidated means that the sand grains are not firmly cemented or compacted, allowing for relatively easy movement of the individual grains. In this test, loose sand was exposed to the high power laser beam (203) and it formed solid (i.e., consolidated) materials that, as previously stated, can be used to create a sealed tunnel (218). Thus, the high power laser beam (203) settings may be adjusted to collapse, spall, dissociate, melt, and vaporize parts of the formation (104) that need to be removed to create the sealed tunnel (218) according to the rock type. Further, the high power laser beam (203) settings may be adjusted when the rock type changes, as required by different formations (104).

Figure 3:
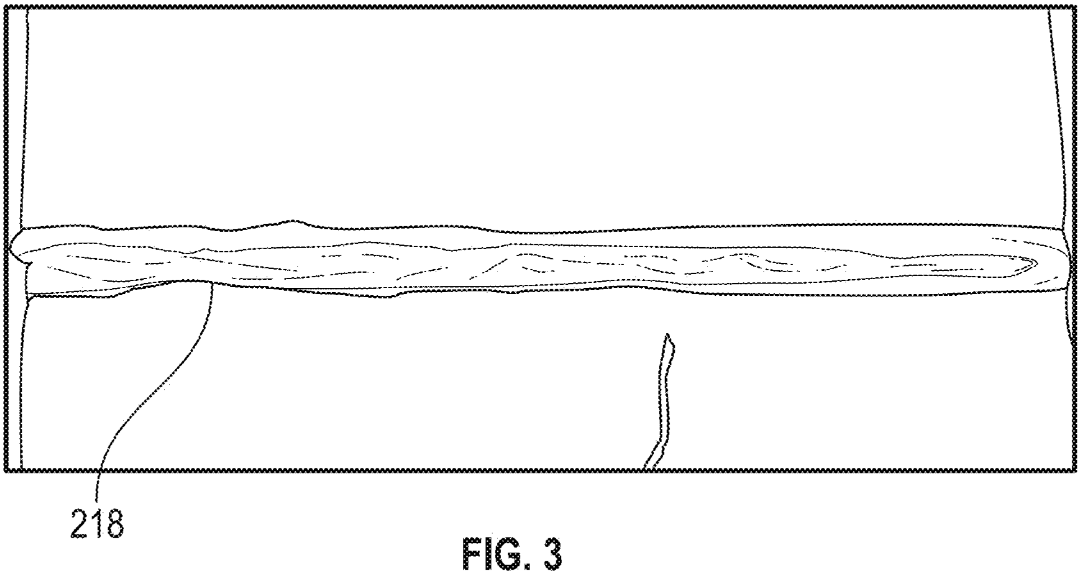
FIG. 3 depicts a sealed tunnel in accordance with one or more embodiments.

By way of example, FIG. 3 shows a sealed tunnel (218) made of melted sandstone. In general, sandstone is primarily composed of sand-sized mineral particles, which often include quartz, that are a form of silicon dioxide. When sandstone is heated to high temperatures, the minerals within it may melt, transform into a molten state (i.e., liquid form), and solidify into fused silica. Fused silica is a high-purity form of glass that is composed of almost pure silicon dioxide. Thus, the process of creating a sealed tunnel (218) involves heating the sandstone to a temperature where the minerals become liquid, followed by cooling to allow the formation of the glassy structure. In the present example, sandstone was melted by using the high power laser beam (203) operated at a power of 4 kW, thus forming the fused silica sealed tunnel (218) shown in FIG. 3.

In accordance with one or more embodiments, the settings of the high power laser beam (203) may be selected by the laser generation unit (200) to create a sealed tunnel (218) of a target penetration depth (e.g., outside the damage zone) and diameter. In general, the target penetration depth may be determined by the specific application and formation (104) qualities (e.g., rock type). Further, the target penetration depth may be obtained by adjusting the timing of the high power laser beam (203). For example, the high power laser beam (203) may remain in continuous mode for a certain time until the target penetration depth is reached. In one or more embodiments, the time duration needed to obtain the target penetration depth may be determined by experiments performed on samples taken, for example, from the formation (104). In some embodiments, a perforation (i.e., an opening) of the closed end of the sealed tunnel (218) may be created by reducing the beam size and increasing the power of the high power laser beam (203). In one or more embodiments, the target penetration depth is validated by injecting, before perforation, a pressurized gas into the sealed tunnel (218) and using one or more sensors included in the laser head (214) to estimate the injected gas volume. The sensors included in the laser head (214) are discussed in greater detail below in the instant disclosure with regard to FIG. 5 and the accompanying description.

Figure 4A:
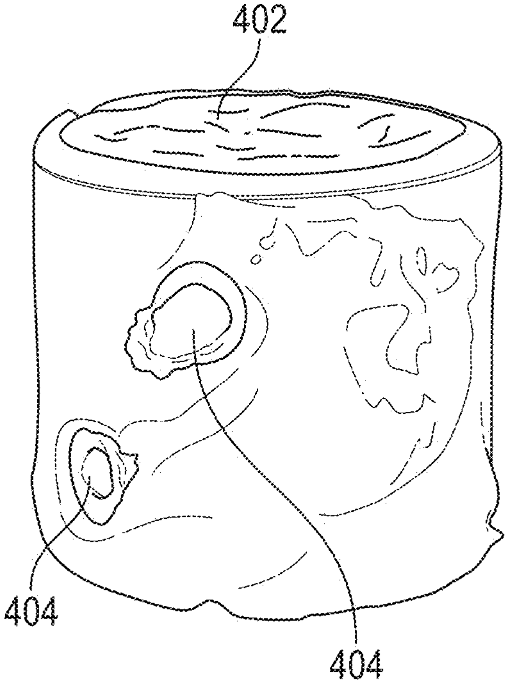
FIG. 4A depicts angular sealed tunnels in accordance with one or more embodiments.
Figure 4B:
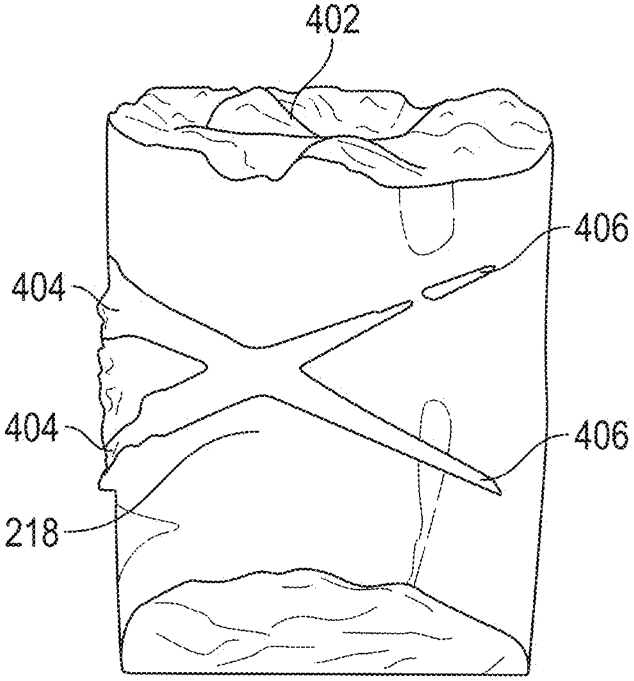
FIG. 4B depicts angular sealed tunnels in accordance with one or more embodiments.

By way of an example, FIG. 4A and FIG. 4B show two illustrations of an extracted sample (402) with angular sealed tunnels (218) created using the high power laser beam (203). It is emphasized that the laser tunneling system is used in-situ (i.e., from within the wellbore) such that depictions of the extracted sample (402) in FIG. 4A and FIG. 4B are to visualize how an angular sealed tunnel may be formed using the laser tunneling system. The 3-axis gimbal (216) controls the direction of the laser head (214) and can thus be used to create sealed tunnels (218) at various angles and orientations, such as those shown in FIG. 4A and FIG. 4B. As previously stated, in general, the sealed tunnel (218) has an open end (404) and a closed end (406). In some embodiments, the closed end (406) of the sealed tunnel (218) is perforated using the high power laser beam (203) and a fluid (e.g., a pressurized gas) is injected through the sealed tunnel (218) to accurately measure a physical property (e.g., permeability) of the extracted sample (402). The target diameter of the sealed tunnel (218) may be obtained by adjusting the beam size of the high power laser beam (203) using, for example, a collimating system, as discussed in greater detail below in the instant disclosure with regard to FIG. 5 and the accompanying description.

Figure 5:
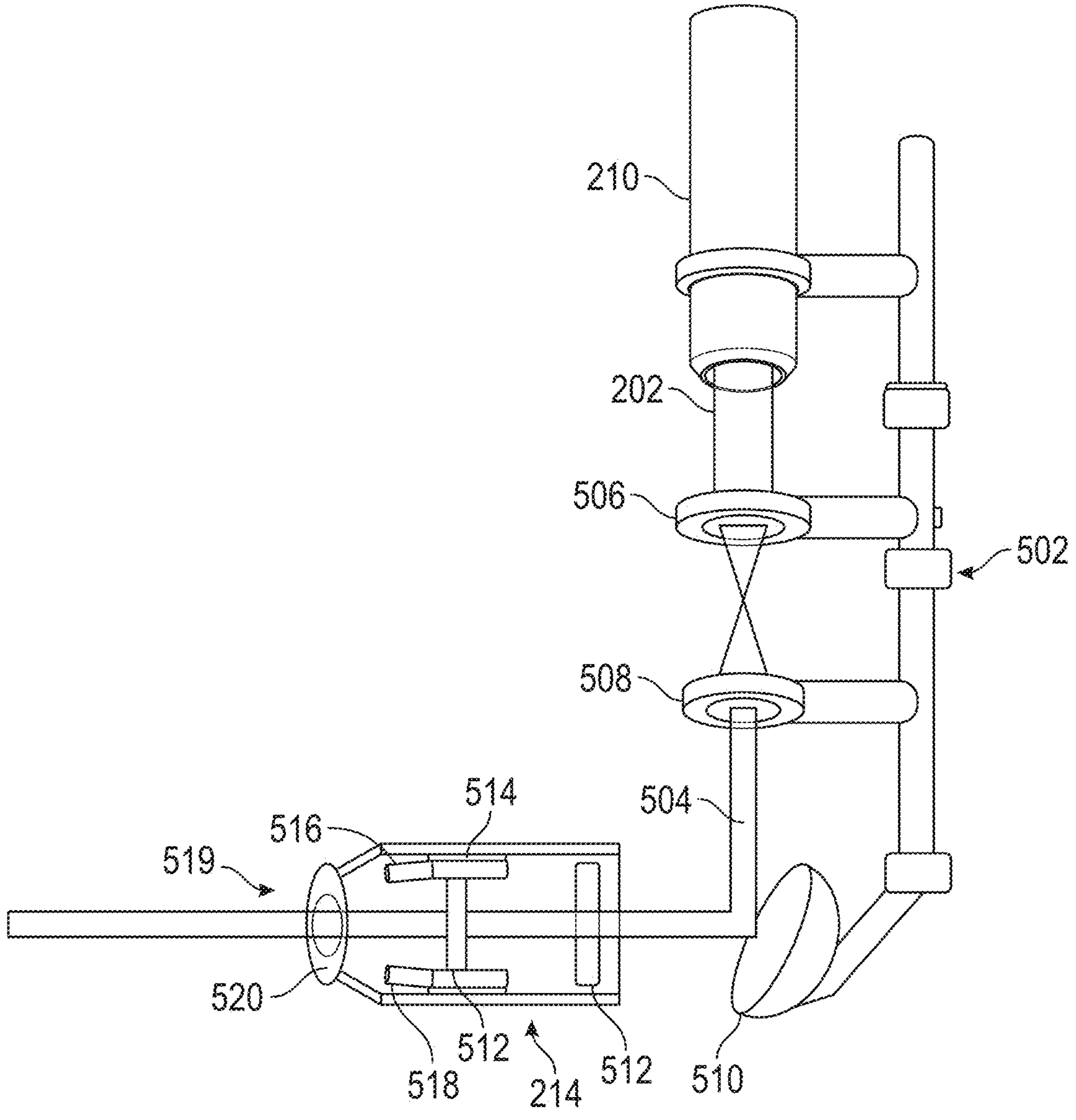
FIG. 5 depicts a system in accordance with one or more embodiments.

FIG. 5 shows a detailed view of the laser head (214) in accordance with one or more embodiments. As previously stated, the insulation cable (210) communicates optical signals (e.g., the high power laser beam (203)) to the downhole tool (212). In one or more embodiments, the insulation cable (210) may include one or more optical fibers. As noted, the insulation cable (210) may be selected to withstand the elevated pressures and temperatures experienced in the wellbore (120).

In accordance with one or more embodiments, a collimating system (502) receives and collimates the high power laser beam (203) to create a collimated laser beam (504). In one or more embodiments, the collimating system (502) may include one or more focusing lenses (506) that control the focal point of the collimated laser beam (504) and manipulate its size and shape. The focusing lenses (506) may include, for example, a convex lens, a concave lens, and a Fresnel lens, and may be used to create a divergent or convergent beam. In one or more embodiments, the collimating system (502) may include a collimator (508) utilized to collimate the high power laser beam (203), i.e., to ensure that the high power laser beam (203) light rays travel in parallel paths. In addition, the collimator (508) may control the beam size of the collimated laser beam (504). In operation, a large beam size may be selected to create a sealed tunnel (218) with a large diameter. Then, after the sealed tunnel (218) is formed, a smaller beam size may create a perforation (i.e., an opening) in the closed end of the sealed tunnel (218). In general, the shape of the sealed tunnel (218) (e.g., circular, conical, etc.) may be determined by selecting an appropriate combination of focusing lenses (506) and collimator (508). For example, a conical sealed tunnel (218) may be created by combining a converging lens (e.g., a bi-convex lens) with a collimator (508) configured to incrementally reduce the beam size of the collimated laser beam (504) as tunneling progresses.

In accordance with one or more embodiments, the collimating system (502) may include a beam manipulator (510) to redirect the collimated laser beam (504) toward various angles and orientations. Non-limiting examples of a beam manipulator (510) include a reflector mirror, a beam splitter, and a prism. In one or more embodiments, the beam manipulator (510) may be adjusted by the controller (209) before, during, or after operation of the high power laser beam (203). In other embodiments, the orientation of the beam manipulator (510) is fixed before the downhole tool (212) is lowered into the wellbore (120) and remains fixed during operation of the high power laser beam (203).

Keeping with FIG. 5, in accordance with one or more embodiments, the laser head (214) receives the collimated laser beam (504) as directed by the beam manipulator (510). As previously noted, the laser head (214) is mounted on the 3-axis gimbal (216) (not shown) thus allowing full range of motion of the laser head (214) in any direction of space. In one or more embodiments, the laser head (214) may include one or more cover lens (512), a fluid knife (514), purging nozzles (516), vacuum nozzles (518), one or more sensors, a laser muzzle (519), and a seal pad (520). In one or more embodiments, the laser muzzle (519) discharges the collimated laser beam (504) from the laser head (214).

In general, the cover lens (512), fluid knife (514), purging nozzles (516), and vacuum nozzles (518) may be used independently or in combination to protect the laser head (214) from fluids, dust, vapor, and other environmental conditions experienced in the wellbore (120). For example, vacuum nozzles (518) may vacuum dust and vapor during operation of the collimated laser beam (504) when the formation (104) is melted to create the sealed tunnel (218). In addition, the fluid knife (514) and purging nozzles (516) may be utilized independently or in combination to provide an unobstructed path (e.g., without scattering) for the collimated laser beam (504) to reach the formation (104). This is accomplished by emitting a fluid (e.g., a gas) capable of sweeping dust and vapor from the path of the collimated laser beam (504). The fluid is assumed to be non-reactive and non-interactive (e.g., air, nitrogen), at least as far as the interaction with the collimated laser beam (504) is concerned. In one or more embodiments, the purging nozzle (516) cools down the laser head (214) during operation of the high power laser beam (203). In one or more embodiments, the fluid knife (514) sweeps the surface of the cover lens (512). In accordance with one or more embodiments, the cover lens (512) are non-distorting optical components, i.e., they are designed to have no (or minimal) impact on the spatial (e.g., beam size, shape, etc.) and temporal (e.g., continuous, pulsed, etc.) characteristics of collimated laser beam (504).

In one or more embodiments, a seal pad (520) is used to seal the laser head (214) against the wellbore (120) wall as the laser head (214) is pressed into the wellbore (120) wall by the 3-axis gimbal (216). The term "wellbore (120) wall" refers to an interior surface of the wellbore (120) such as, for example, a sidewall. The seal pad (520) may be located at one end of the laser head (214), e.g., adjacent to the laser muzzle (519). In such an embodiment, the purging nozzles (516) are used to inject a pressurized gas (e.g., air, nitrogen, etc.) into the sealed tunnel (218) to determine the permeability of the surrounding rock formation (104). In accordance with one or more embodiments, the one or more sensors may include a temperature sensor (226), a pressure sensor (228), and a gas flow rate meter (230). The sensor readings may be obtained using specialized tools such as, for example, thermometers, pressure gauges, and flowmeters. The sensors may be used for sensing characteristics of the pressurized gas (e.g., air, nitrogen, etc.) injected into the sealed tunnel (218) such as, for example, pressurized gas pressure (P), pressurized gas temperature (T), and pressurized gas flow rate (Q). The pressurized gas pressure (P) and the atmospheric pressure ($P_{atm}$) may be measured (e.g., using a barometer) in-situ or at the surface (108). In one embodiment, the pressurized gas pressure (P), atmospheric pressure ($P_{atm}$), and pressurized gas flow rate (Q) are used to determine the permeability of the surrounding rock formation (104), as described in greater detail below. In such an embodiment, the pressurized gas temperature (T) may be utilized to monitor isothermal (i.e., constant temperature) conditions and correct the pressurized gas viscosity u for any temperature variations as needed. In another embodiment, a change in the pressure sensor signal may indicate a change in the tunneling operation status. For example, a sudden drop in pressure, as determined by the pressure sensor, may indicate tunneling of the sealed tunnel (218) is underway. One skilled in the art will appreciate that other suitable sensor types may exist and may be used without limiting the scope of the present disclosure.

Figure 6:
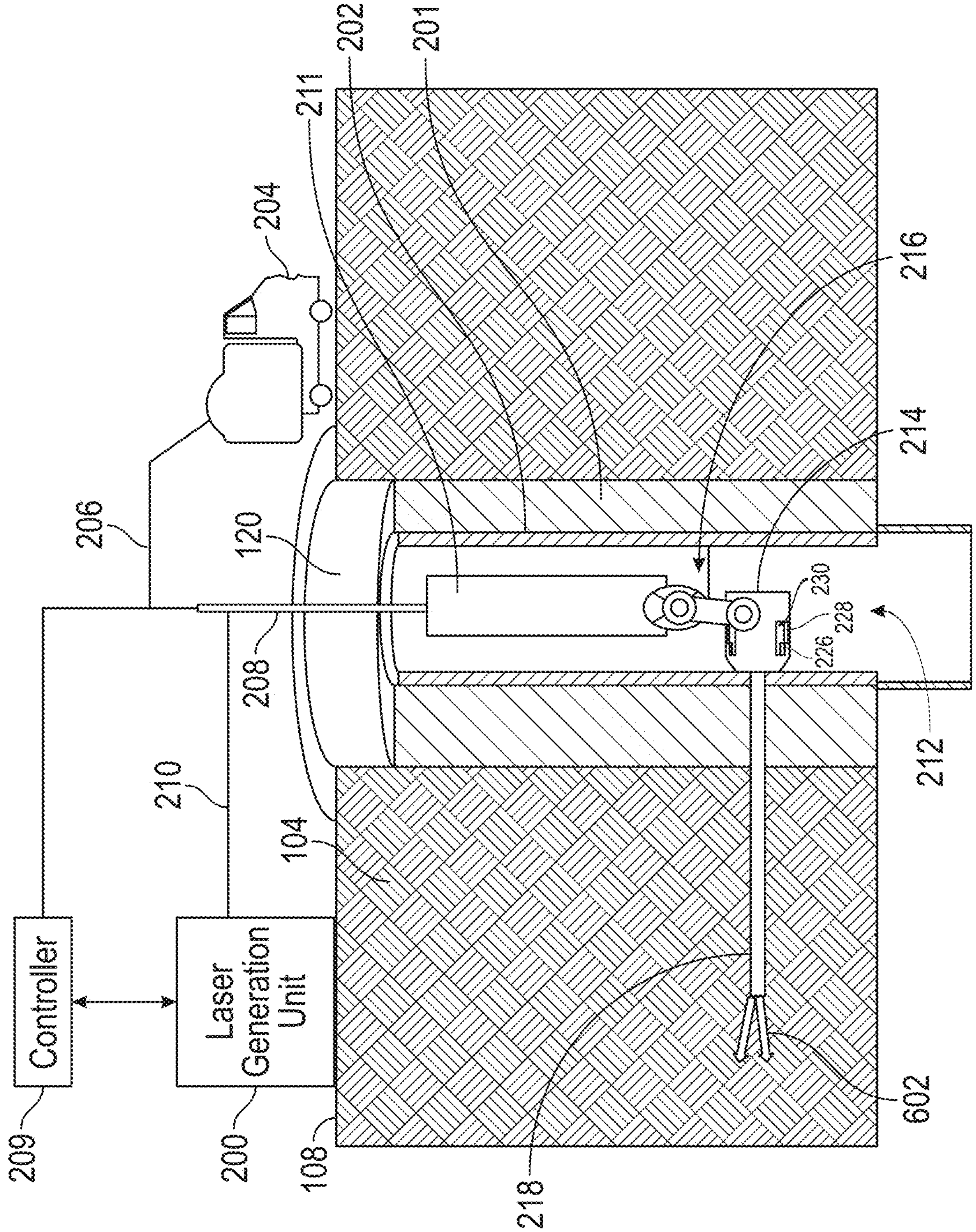
FIG. 6 depicts a system in accordance with one or more embodiments.

FIG. 6 depicts the acquisition of in-situ permeability measurements with the laser tunnelling system for in-situ permeability measurements, in accordance with one or more embodiments. As previously stated, the laser head (214) is mounted on the 3-axis gimbal (216) thus allowing full range of motion of the laser head (214) in any direction of space. In addition, the laser head (214) may include purging nozzles (516), one or more sensors, and a seal pad (520). Thus, in one or more embodiments, the 3-axis gimbal (216) actuates the laser head (214) to seal itself against the wellbore (120) wall with the seal pad (520). In such an embodiment, the purging nozzles (516) are used to inject a pressurized gas (602) (e.g., air, nitrogen, etc.) into the sealed tunnel (218) and the one or more sensors (e.g., a temperature and pressure sensor (226, 228), and gas flow rate meter (230) measure one or more of: pressurized gas pressure (P); pressurized gas temperature (T); and pressurized gas flow rate (Q). As shown in FIG. 6, the laser tunneling system of the present invention is used to measure the permeability of the subsurface formation (104) by creating a sealed tunnel (218) that transports the pressurized gas (602) directly into the undamaged matrix formation (104) through a perforated end of the sealed tunnel (218). As such, embodiments disclosed measure the in-situ permeability of the surrounding rock formation (104) in a wellbore (120) away from the damage zone.

In accordance with one or more embodiments, the permeability of the surrounding rock formation (104) may be determined using a steady-state method. Typically, the steady-state method operates by injecting a pressurized gas (602) (e.g., air, nitrogen, etc.) into a porous media (e.g., through the sealed tunnel (218) to an undamaged zone) at a constant pressure. In such an embodiment, the pressurized gas (602) injection pressure (P) and flow rate (Q) are simultaneously measured. In one or more embodiments, the pressurized gas (602) may be injected through a tip (e.g., laser muzzle (519)) and a tip-seal (e.g., the seal pad (520)) with inner radius $r_i$ and outer radius $r_0$ ($r_0>r_i$) is used to prevent gas leakage. The pressure outside of the tip-seal (i.e., $r>r_0$) is the atmospheric pressure $P_{atm}$. In general, for a constant injection pressure, the flow rate (Q) of the pressurized gas (602) increases as the permeability κ increases.

Keeping with FIG. 6, at steady-state, the pressurized gas (602) flow entering the sealed tunnel (218) is a function of the pressurized gas (602) compressibility, permeability at the point of injection, pressurized gas (602) pressure (P), viscosity μ of the pressurized gas (602) at the injection pressure and temperature, gas slippage effects (e.g., Klinkenberg) at low injection pressures, high velocity flow effects (e.g., Forchheimer) at high gas flow rates, size and shape of the seal pad (520), and the geometry of the gas flow path in the sealed tunnel (218). As previously stated, in general, the viscosity μ of a gas (e.g., the pressurized gas (602)) depends on temperature and thus may be corrected using the pressurized gas (602) temperature as determined, for example, by a temperature sensor. For a tip-seal configuration, the apparent permeability may be mathematically given by a modified form of Darcy's law:

$$k_{apparent} = \frac{2Q\mu P_{atm}}{r_i G_0\left(P^2 - P_{atm}^2\right)}, \quad \text{(Equation 1)}$$

where $k_{apparent}$ is the apparent permeability of the porous media (e.g., the sealed tunnel (218)), Q is the flow rate of the pressurized gas (602) at atmospheric pressure, μ is the dynamic viscosity of the pressurized gas (602), $P_{atm}$ is the atmospheric pressure, $r_i$ is the inner radius of the tip-seal, P is the injection pressure of the pressurized gas (602), and $G_0$ is a dimensionless geometrical flow factor. In general, this dimensionless geometrical factor $G_0$ is a function of the ratio of the outer to the inner radius of the tip-seal (i.e., $G_0=G_0(r_0/r_i)$) and may be determined through numerical simulations by considering the geometry of the gas flow path in the porous media (e.g., the sealed tunnel (218)).

Equation (1) ignores gas slippage and high-velocity flow effects. As such, appropriate corrections may be needed. The gas slippage effect, for example, causes the apparent permeability to be a function of the pressurized gas (602) pressure. Physically, Klinkenberg effects arise when the mean free path of the gas molecules of the pressurized gas (602) approach the dimension of the pores in the porous media (e.g., the sealed tunnel (218)), and thus the gas molecules accelerate (i.e., slip) when contacting the pore surfaces. The gas slippage effect may be compensated at low mean pressures using the usual Klinkenberg equation:

$$k_k = \frac{k_{apparent}}{1 + \frac{b}{P_{mean}}}, \quad \text{(Equation 2)}$$

where $k_k$ is the permeability corrected for gas slippage effect, b is the Klinkenberg slip correction factor, and $P_{mean}$ is the mean pressure $$\left(\text{i.e., } P_{mean} = \frac{P + P_{atm}}{2}\right).$$

The Klinkenberg slip correction factor b is a measure of slippage and depends on the pore structure of the porous media (e.g., the sealed tunnel (218)), temperature of the pressurized gas (602), and generally decreases with increasing $k_k$.

In addition to gas slippage effects, turbulence and inertial (i.e., Forchheimer) effects are two phenomena that influence the apparent permeability and are not captured by Equation (1). For example, if the flow rate Q of the pressurized gas (602) used in the steady-state method is too high, the flow regime may become turbulent. Turbulent flows typically occur in, for example, formations (104) with a high permeability. These processes may cause the apparent permeability to depend on the flow rate Q. The following equation may be used to model Forchheimer effects:

$$\frac{1}{k_0} = \frac{1}{k_k} - F_h Q, \quad \text{(Equation 3)}$$

where $k_0$ is the permeability corrected for the Forchheimer effect, and $F_h$ is the high velocity correction factor.

The steady-state method may not be adequate for tight rocks with low permeability (e.g., shales) because the flow rates across these samples are typically too small to be measured. For example, achieving steady-state conditions in low permeability samples may take anywhere from minutes to hours. In addition, artifacts (e.g., condensation, leaks, etc.) may occur in experiments lasting too long. This makes the steady-state method time-consuming and inaccurate for low permeability samples. Therefore, the unsteady-state method based on the pulse decay signal becomes the preferred option for formations (104) with low permeability. In general, the unsteady-state method produces faster, more reproducible results, and it is easier to measure in comparison to the steady-state method.

Figure 7:
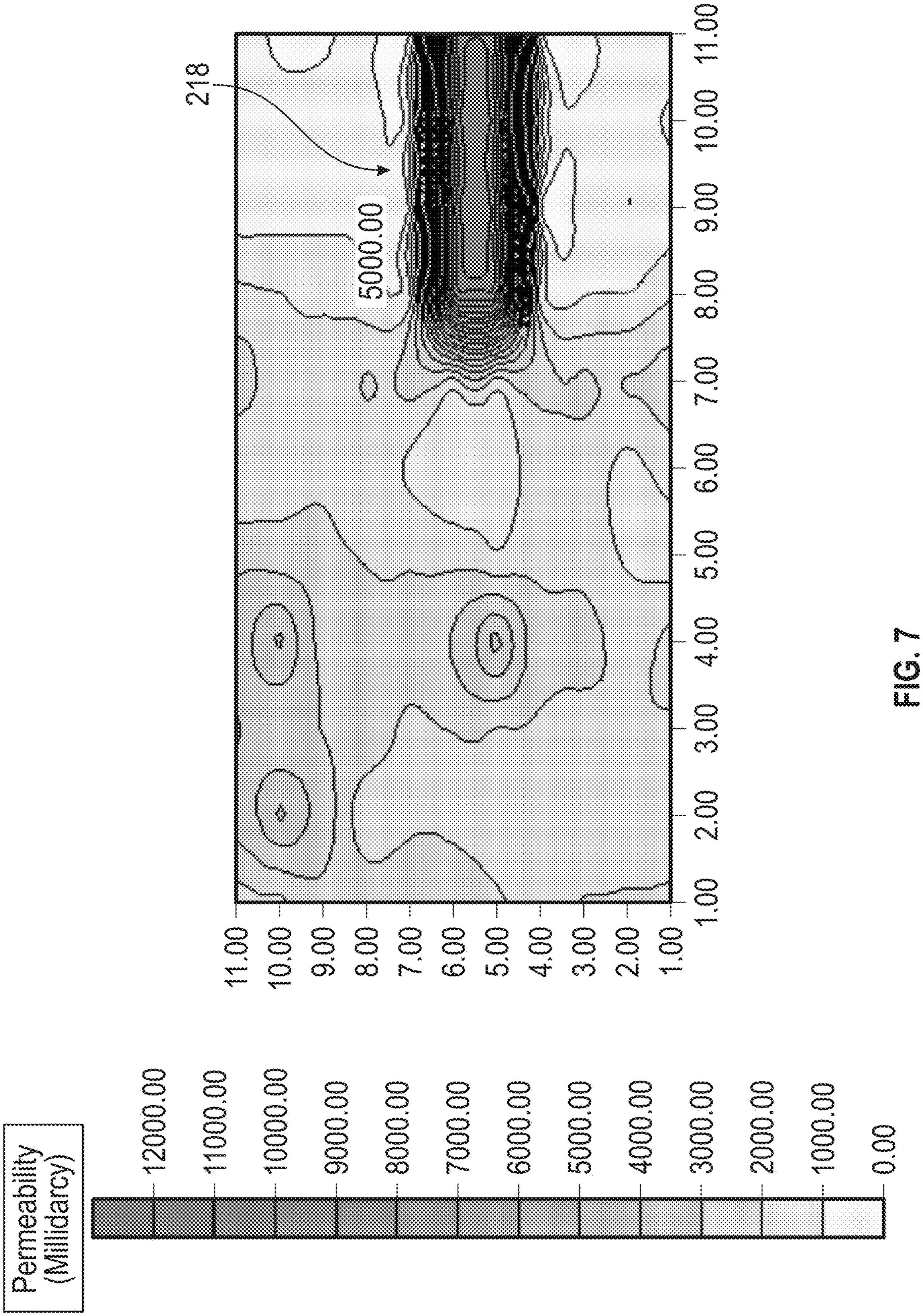
FIG. 7 depicts in-situ permeability measurements of a rock formation in accordance with one or more embodiments.

In accordance with one or more embodiments, in the unsteady-state method the sealed tunnel (218) is saturated with an inert gas (e.g., nitrogen) and kept at uniform pressure until it reaches equilibrium (i.e., steady-state). Then, the equilibrium state is perturbed by imposing a pressure gradient across the sealed tunnel (218), for example, by increasing the pressure of the pressurized gas (602). Consequently, the differential pressure decays in an attempt to restore back to the equilibrium state. The decay of the differential pressure is experimentally measured and analyzed to obtain the permeability. The pressure gradient as a function of time may be mathematically described as:

$$\Delta P(t) = -\left(\frac{Q_0 \mu L}{k_{apparent} A \alpha}\right)(1 - e^{-\alpha t}), \quad \text{(Equation 4)}$$

where $\Delta P(t)$ is the differential pressure across the porous media (e.g., the sealed tunnel (218)) at time t, $Q_0$ is the initial flow rate at time t=0, $k_{apparent}$ is the apparent permeability, A is the cross-sectional area perpendicular to the pressurized gas (602) flow direction, and $\alpha$ is the pressure decay constant. Using Equation (4), the downhole tool (212) may measure the pressure at different time intervals and fit the collected data into a pressure decay graph to extract apparent permeability. Depending on the exact setup of the tool, additional boundary conditions may be considered to create a more accurate unsteady-state pressure decay curve. In general, Equation (4) may be corrected for both Klinkenberg and Forchheimer effects. As a concrete example, FIG. 7 shows in-situ permeability measurements (in units of millidarcy) of the surrounding rock formation (104) using the unsteady-state method. Additionally, Table I shows the measured change in permeability for different rock types including Berea sandstone, reservoir sandstone, limestone, and shale.

TABLE I

Example of measured change in permeability for various rock types according to an un-steady permeability measurement method.

| Rock Type | Permeability Increase (%) |
|---|---|
| Berea Yellow | 2 |
| Berea Gray | 22 |
| Limestone | 33 |
| Sandstone | 171 |
| Shale | 28 |

Figure 8:
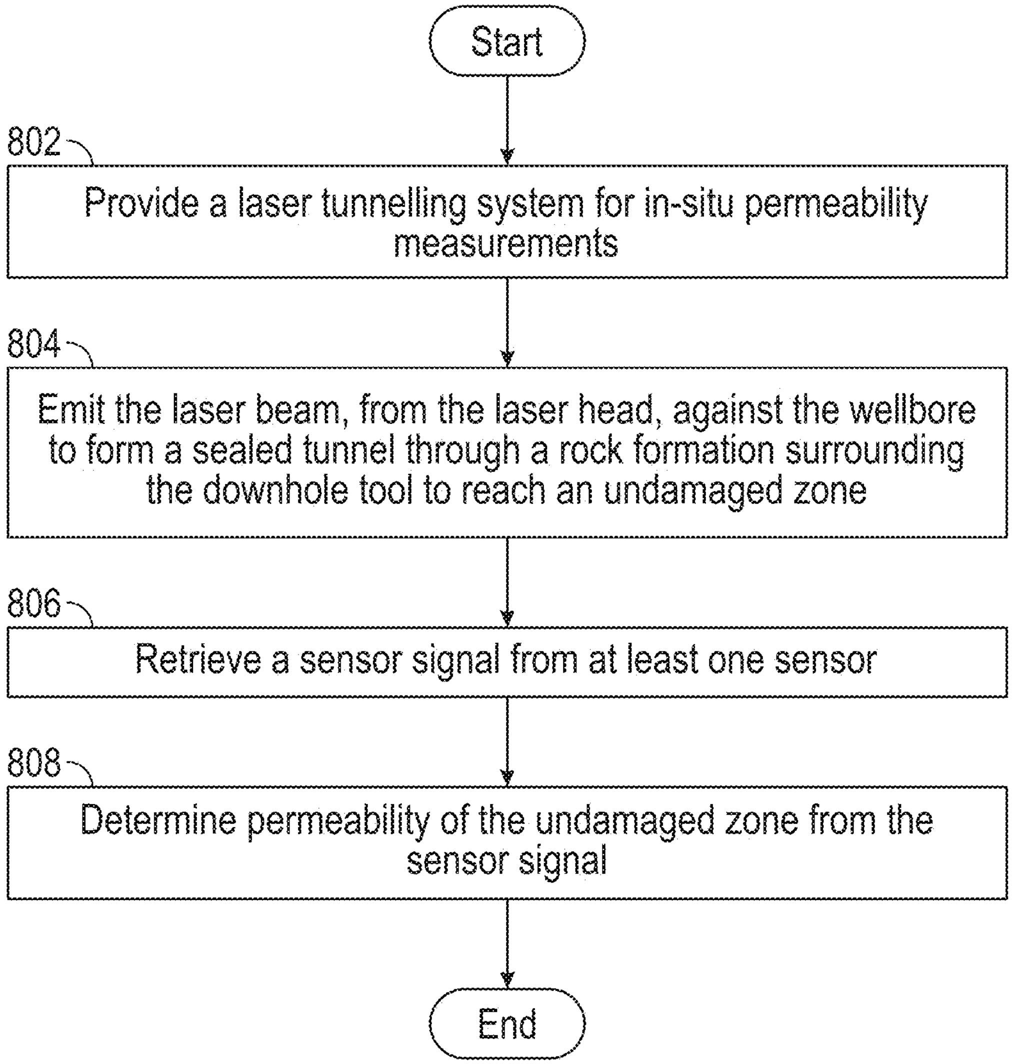
FIG. 8 depicts a flowchart in accordance with one or more embodiments.

FIG. 8 depicts a method for in-situ permeability measurements in a wellbore, in accordance with one or more embodiments. In Block 802, a laser tunnelling system for in-situ permeability measurements is provided. The laser tunnelling system comprises a laser generation unit (200), a downhole tool (212), and a fiber optic cable. The fiber optic cable conveys the high power laser beam (203) from the laser generation unit (200) to the downhole tool (212).

The laser generation unit (200) consists of, at least, a high power laser source and provides the power required to generate the high power laser beam (203). The laser generation unit (200) may be of any type capable of generating the high power laser beam (203) such as, for example, a gas laser, a solid-state laser, a fiber laser, a liquid laser (i.e., a dye laser) and a semiconductor laser (i.e., a laser diode). In some embodiments, the high power laser beam (203) may be an Ytterbium (Yb) fiber laser. The laser generation unit (200) may control the settings of the high power laser beam (203), such as energy, power, wavelength, timing (e.g., continuous operation, pulsed operation, etc.), direction, and beam size.

The downhole tool (212) is lowered into the wellbore (120) to a target depth. In one or more embodiments, a mobile deployment unit (204) (e.g., a coiled tubing unit) located at the surface (108) and close to the existing wellbore (120) supports the deployment of a deployment device (206) (e.g., coiled tubing, wireline, etc.) used to lower the downhole tool (212) into the wellbore (120). The downhole tool (212) is in communication with the controller (209) such that it may be lowered to a target depth within the wellbore (120) using the deployment device (206). For example, the downhole tool (212) may be equipped with one or more sensors that transmit an electrical signal to the controller (209) when a target depth is reached. The one or more sensors can be housed in the longitudinal body (211). The controller (209) includes a computer system (902) that controls the downhole tool (212) and is programmed to automatically move the downhole tool (212) to a target depth, direction, and orientation. The downhole tool (212) comprises, at least, a laser head (214).

In Block 804, the high power laser beam (203) is emitted from the laser head (214) against the wellbore (120) to form a sealed tunnel (218) through a rock formation (104) surrounding the downhole tool (212) to reach a target penetration depth (e.g., undamaged zone). In one or more embodiments, the high power laser beam (203) may remain in continuous mode for a certain time until the target penetration depth is reached, where the time duration needed to obtain the target penetration depth may be determined by experiments performed on samples taken, for example, from the formation (104).

In Block 806, a sensor signal from at least one sensor is retrieved. In one or more embodiments, the laser head (214) may include purging nozzles (516) and one or more sensors. In such an embodiment, the purging nozzles (516) are used to inject a pressurized gas (e.g., air, nitrogen, etc.) into the sealed tunnel (218) to determine the permeability of the surrounding rock formation (104). In accordance with one or more embodiments, the one or more sensors may include a temperature sensor (226), a pressure sensor (228), and a gas flow rate meter (230). The sensor readings may be obtained using specialized tools such as, for example, thermometers, pressure gauges, and flowmeters. The sensors may be used for sensing characteristics of the pressurized gas (e.g., air, nitrogen, etc.) injected into the sealed tunnel (218) such as, for example, pressurized gas pressure (P), pressurized gas temperature (T), and pressurized gas flow rate (Q).

In Block 808, the permeability of the surrounding formation (104) beyond the near-wellbore damage zone (i.e., undamaged zone) is determined based on the sensor signal. In accordance with one or more embodiments, the permeability is determined using a steady-state method. The steady-state method operates by injecting a pressurized gas (602) (e.g., air, nitrogen, etc.) into a porous media (e.g., the sealed tunnel (218)) at a constant pressure. In such an embodiment, the pressurized gas (602) injection pressure (P) and flow rate (Q) are simultaneously measured, and the permeability is determined using Equation (1), where Equation (1) may be adapted to account for effects such as gas slippage. In general, for a constant injection pressure, the flow rate (Q) of the pressurized gas (602) increases as the permeability increases. In one or more embodiments, the pressurized gas (602) temperature (T) may be monitored using the temperature sensor, and the viscosity $\mu$ of the pressurized gas (602) may be corrected for temperature variations. In another embodiment, the permeability is determined using an unsteady-state method, which is adequate for low permeability samples. In the unsteady-state method, the equilibrium state (i.e., steady-state) is perturbed by imposing a pressure gradient across the sample. The decay of the differential pressure is experimentally measured and analyzed to obtain the permeability of the sample using Equation (4). In general, Equation (1) and Equation (4) may be corrected for both Klinkenberg (i.e., gas slippage) and Forchheimer (i.e., high-velocity flow) effects using Equation (2) and Equation (3), respectively.

Figure 9:
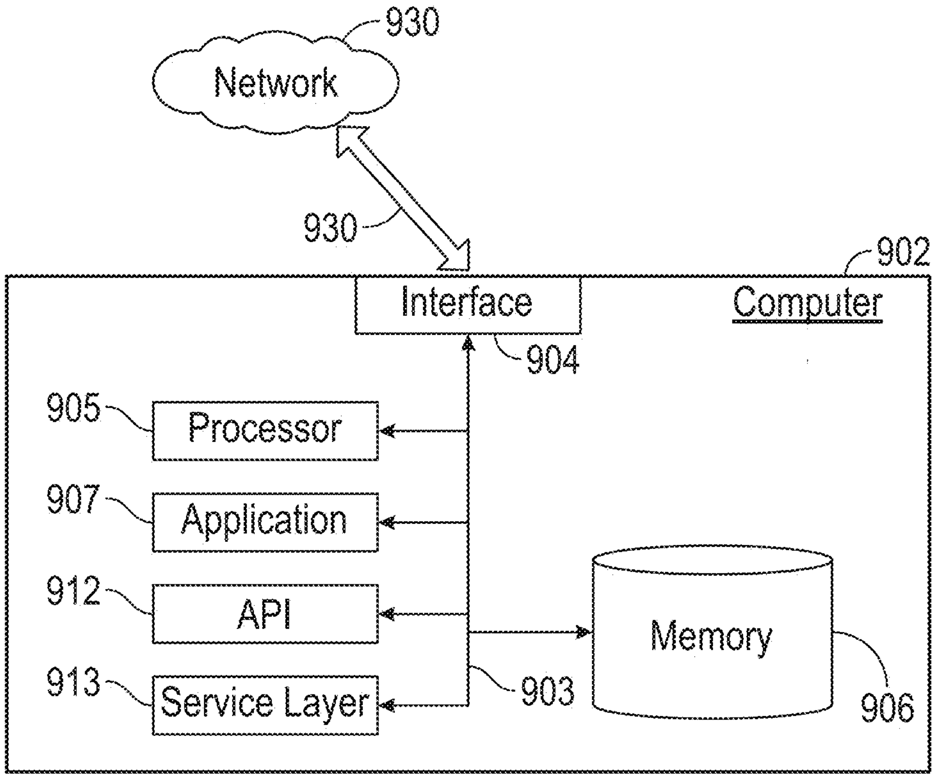
FIG. 9 depicts a computing system in accordance with one or more embodiments.

Embodiments disclosed herein may be implemented on a computer system. FIG. 9 is a block diagram of a computer system (902) used to provide computational functionalities associated with described algorithms, methods, functions, processes, flows, and procedures as described in the instant disclosure, according to one or more embodiments. For example, the controller (209) of the laser tunnelling system for in-situ permeability measurements can include, or can be, a computer system (902) such as that depicted in FIG. 9. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device such as an edge computing device, including both physical or virtual instances (or both) of the computing device. An edge computing device is a dedicated computing device that is, typically, physically adjacent to the process or control with which it interacts.

Additionally, the computer (902) may include a computer that includes an input device, such as a keypad, keyboard, touch screen, or other device that may accept user information, and an output device that conveys information associated with the operation of the computer (902), including digital data, visual, or audio information (or a combination of information), or a GUI.

The computer (902) may serve in a role as a client, network component, a server, a database or other persistency, or any other component (or a combination of roles) of a computer system for performing the subject matter described in the instant disclosure. In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) may receive requests over network (930) from a client application (for example, executing on another computer (902) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) may communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that may be connected to the network (930). The memory may be a non-transitory computer readable medium. For example, memory (906) may be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) may be external to the computer (902).

The application (907) is an algorithmic software engine providing functionality according to particular needs, desires, or particular implementations of the computer (902), particularly with respect to functionality described in this disclosure. For example, application (907) may serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) may be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A laser tunnelling system for in-situ permeability measurements in a wellbore, the system comprising:

a laser generation unit configured to generate a laser beam;

a downhole tool;

a controller communicably connected to the laser generation unit and the downhole tool; and a fiber optic cable coupled to the laser generation unit and configured to convey the laser beam to the downhole tool;

wherein the downhole tool comprises:

a laser head that receives the laser beam, the laser head comprising:

a laser muzzle positioned to emit the laser beam, from the laser head, against the wellbore to form a sealed tunnel through a rock formation surrounding the downhole tool to reach an undamaged zone;

a purging nozzle proximate to the laser muzzle and configured to discharge a pressurized gas;

a pressure sensor and a gas flow rate meter disposed adjacent to the laser muzzle, wherein the pressure sensor is configured to measure a pressure signal of the pressurized gas, and the gas flow rate meter is configured to measure a flow rate of the pressurized gas; and a seal pad adjacent to the laser muzzle; and a 3-axis gimbal from which the laser head is mounted; and wherein the controller comprises a processor configured to:

retrieve sensor signals from the pressure sensor and the gas flow rate meter; and determine a permeability of the undamaged zone from the sensor signals.

2. The laser tunnelling system of claim 1, wherein the 3-axis gimbal comprises:

a rotation joint configured to rotate the laser head over a first degree of freedom;

a pivot joint and a pivot arm configured to pivot the laser head over a second degree of freedom; and a tilt joint configured to tilt the laser head over a third degree of freedom.

3. The laser tunnelling system of claim 1, further comprising:

a collimating system configured to collimate the laser beam, comprising:

a focusing lens configured to create a focused laser beam;

a collimator positioned to receive the focused laser beam and configured to create a collimated laser beam; and a beam manipulator configured to direct the collimated laser beam.

4. The laser tunnelling system of claim 3, wherein a beam size of the laser beam is controlled by the collimating system.

5. The laser tunnelling system of claim 1, wherein the purging nozzle is configured to remove dust from a path of the laser beam and cool down the laser head during operation of the laser beam.

6. The laser tunnelling system of claim 1, further comprising an insulation cable, the insulation cable comprising the fiber optic cable, wherein the insulation cable is selected to resist a high temperature and a high pressure.

7. A method for in-situ permeability measurements in a wellbore, the method comprising:

providing a laser tunnelling system for in-situ permeability measurements, comprising:

a laser generation unit configured to generate a laser beam;

a downhole tool comprising a laser head; and a fiber optic cable coupled to the laser generation unit and configured to convey the laser beam to the downhole tool;

emitting the laser beam, from the laser head, against the wellbore to form a sealed tunnel through a rock formation surrounding the downhole tool to reach an undamaged zone;

retrieving sensor signals from a pressure sensor and a gas flow rate meter disposed adjacent to a laser muzzle, wherein the pressure sensor is configured to measure a pressure signal of a pressurized gas, and the gas flow rate meter is configured to measure a flow rate of the pressurized gas; and determining permeability of the undamaged zone from the sensor signals.

8. The method of claim 7, further comprising:

determining a change in a perforation operation status based on a change in the pressure signal.

9. The method of claim 7:

wherein the downhole tool further comprises:

the laser muzzle positioned to emit the laser beam from the laser head; a purging nozzle disposed proximate to the laser muzzle and configured to discharge the pressurized gas;

a seal pad adjacent to the laser muzzle; and a 3-axis gimbal from which the laser head is mounted;

wherein the sealed tunnel is formed by emitting the laser beam at a first laser power with a first beam size to melt the surrounding rock formation;

wherein the sealed tunnel comprises an open end proximate to the wellbore and a closed end; and wherein the method further comprises:

lowering the downhole tool into the wellbore to a target depth;

selecting the first laser power with the first beam size;

selecting a second laser power with a second beam size;

perforating the closed end of the sealed tunnel with the laser beam at the second laser power with the second beam size;

actuating the laser head of the downhole tool using the 3-axis gimbal to seal the laser head against a wellbore wall with the seal pad; and injecting the pressurized gas into the sealed tunnel using the purging nozzle.

10. The method of claim 9, further comprising:

purging a path of the laser beam of dust and vapor with the purging nozzle; and vacuuming dust and vapor with a vacuum nozzle of the laser head during operation of the laser beam.

11. The method of claim 9, wherein the seal pad is annular and defined by an inner radius and an outer radius, and wherein determining the permeability of the surrounding rock formation is based on a ratio of the outer radius to the inner radius of the seal pad.

12. The method of claim 9, wherein the second laser power is higher than the first laser power.

13. The method of claim 9, wherein the first beam size is larger than the second beam size.

14. A system for performing in-situ permeability measurements in a wellbore, the system comprising:

a laser tunnelling system, comprising:

a laser generation unit configured to generate a laser beam;

a downhole tool;

a controller communicably connected to the laser generation unit and the downhole tool; and a fiber optic cable coupled to the laser generation unit and configured to convey the laser beam to the downhole tool;

wherein the downhole tool comprises:

a laser head that receives the laser beam, the laser head comprising:

a laser muzzle positioned to emit the laser beam, from the laser head, against the wellbore to form a sealed tunnel through a rock formation surrounding the downhole tool to reach an undamaged zone;

a purging nozzle proximate to the laser muzzle and configured to discharge a pressurized gas;

a pressure sensor and a gas flow rate meter disposed adjacent to the laser muzzle, wherein the pressure sensor is configured to measure a pressure signal of the pressurized gas, and the gas flow rate meter is configured to measure a flow rate of the pressurized gas; and a seal pad adjacent to the laser muzzle; and a 3-axis gimbal from which the laser head is mounted; and wherein the controller comprises a processor configured to:

retrieve sensor signals from the pressure sensor and the gas flow rate meter; and determine a permeability of the undamaged zone from the sensor signals; and a deployment device configured to convey the downhole tool into the wellbore.

15. The system of claim 14, further comprising:

a collimating system configured to collimate the laser beam, comprising:

a focusing lens configured to create a focused laser beam;

a collimator positioned to receive the focused laser beam and configured to create a collimated laser beam; and a beam manipulator configured to direct the collimated laser beam.

16. The system of claim 14, wherein the deployment device comprises coiled tubing.

17. The system of claim 14, wherein the 3-axis gimbal comprises:

a rotation joint configured to rotate the laser head over a first degree of freedom;

a pivot joint and a pivot arm configured to pivot the laser head over a second degree of freedom; and a tilt joint configured to tilt the laser head over a third degree of freedom.

* * * * *